United States Patent Office 3,567,654
Patented Mar. 2, 1971

3,567,654
PROCESS AND CATALYST FOR HYDROCRACKING HYDROCARBON OIL
Ross E. Van Dyke, Orinda, Calif., assignor to Shell Oil Company, New York, N.Y.
No Drawing. Continuation-in-part of application Ser. No. 393,735, Sept. 1, 1964, which is a continuation-in-part of application Ser. No. 184,947, Apr. 4, 1962. This application July 29, 1965, Ser. No. 475,870
Int. Cl. B01j *11/24*
U.S. Cl. 252—459                                3 Claims

ABSTRACT OF THE DISCLOSURE

A catalyst for hyddocracking hydrocarbon oils comprises an iron group metal and fluorine incorporated into an amorphous acid-acting refractory oxide, the incorporation being carried out by contacting a hydrogel of said refractory oxide with an aqueous solution of an iron group metal compound, washing the contacted hydrogel and calcining at a temperature of about 800 to 1200° F.

---

This application is a continuation-in-part of application, Ser. No. 393,735, filed Sept. 1, 1964, now abandoned, which is a continuation-in-part of application, Ser. No. 184,947, filed April 4, 1962 now abandoned.

This invention relates to a process for the catalytic conversion of hydrocarbons. More particularly, this invention relates to the destructive hydrogenation of hydrocarbons and improved catalysts therefor.

Destructive hydrogenation, more commonly called hydrocracking, by catalytic means is old and well known to the art. Destructive hydrogenation of a hydrocarbon oil, usually a coal tar of a high-boiling petroleum fraction, such as gas oils or topped crude, generally is carried out at quite high temperatures and pressures of the order of 850° F. and 1500 p.s.i.g. and up. Catalysts for the destructive hydrogenation of oil are generally a combination of hydrogenation and cracking catalysts. Of the hydrogenation catalysts, molybdenum and tungsten and the oxides and sulfides thereof have generally been most favored. The cracking catalyst has generally been an activated clay or synthetic silica-alumina.

In a destructive hydrogenation process, high boiling oil feed is usually hydrogenated in a first stage and then hydrocracked in a second stage. Hydrogenation in the first stage must be sufficient to assure almost complete removal of nitrogen compounds, i.e., to below 5 parts per million, in order for activity of the hydrocracking catalyst in the second stage to remain at a high level (see "Progress in Hydrogenation of Coal and Tar," by Kenneth Gordon, Chemical Age, volume 55, pages 795–804, Dec. 28, 1946). Hydrogenation to such an extremely low nitrogen content adds greatly to the cost of the over-all hydrocracking process. Destructive hydrogenation processes have been used primarily in Europe, and have been little used by refiners in America because of their known high cost, and because the catalysts have in general been low in activity, highly susceptible to poisons such as nitrogen compounds, and have a relatively poor life.

More recently, however, a hydrocracking process has been described which is carried out at somewhat lower temperatures and pressures with a catalyst comprising nickel sulfide or cobalt sulfide deposited on silica-alumina cracking catalyst. This process, as with the older process, has the disadvantage that the catalyst is highly susceptible to poisons such as nitrogen compounds. Therefore, the high boiling hydrocarbon oil must be subjected to a severe pretreatment for the removal of nitrogen compounds such as pretreatment with acids, acidic ion-exchange resins or by severe catalytic hydrogenation treatment. Moreover, even with an essentially nitrogen-free feed it is considered necessary to operate initially at a relatively low temperature for a period of time to achieve a long catalyst life.

An improved hydrocracking process has now been found which employs a catalyst markedly superior to those used heretofore. The catalyst of the process of the invention comprises an acid-acting refractory oxide and a metal of the iron group of Group VIII of the Periodic Table of Elements. A particularly active and improved catalyst comprises silica, alumina, an iron group metal, and a fluoride. The iron group metal is apparently bound with the other components of the catalyst in such a manner that it is highly active and stable for hydrocracking high boiling oils and yet is less susceptible to poisons, such as nitrogen, which are generally present in such hydrocarbon oils. Of the iron group metals, nickel provides a highly active catalyst for hydrocracking conversion and is preferred for such conversions.

The catalyst is prepared by contacting a hydrogel of the acid-acting refractory oxide substantially free from sodium (less than about 0.1% w. on a solids basis) with an aqueous solution of an iron group metal compound. The iron group metal compound can be any suitable water-soluble compounds, e.g. nitrates, wherein the iron group metal is present as a cation. For markedly active and stable catalysts of this invention, fluorine is incorporated into the hydrogel, preferably from a common solution with the iron group metal. The iron group metal cation presumably exchanges with cations in the hydrogel, for example, ammonium ions in the case of a hydrogel which has been washed with an ammonium salt to remove sodium ions, or is firmly bound in some manner within the gel, since metal is retained in the gel even when the metal-containing gel is washed with water to remove excess metal solution.

Thus, in accordance with the process of the present invention, a hydrocarbon distillate, preferably boiling above the boiling range of gasoline, for example, boiling in the range of about 450° to 950° F., is subjected to hydrocracking at elevated temperatures and pressures in the presence of a catalyst comprising a metal of the iron group which has been incorporated into a silica-alumina hydrogel substantially free from sodium.

Operating conditions employed in the hydrocracking conversion include a temperature in the range of about 500° to about 850° F., a hydrogen partial pressure of about 750 to about 3000 p.s.i.a., a liquid hourly space velocity of about 0.2 to about 10, preferably 0.5 to 5, and a hydrogen-to-oil mole ratio of about 5 to about 50.

It is generally desirable to subject the hydrocarbon feed to a suitable pretreatment such as a relatively mild hydrogenation treatment, e.g., a catalytic hydrogenation treatment with a hydrogenation catalyst such as cobalt or nickel and molybdenum on alumina, silica-alumina, or other suitable supports. An advantage of such a hydrogenation treatment is to remove from the feed coke-forming constituents which tend to deposit on the hydrocracking catalyst and to remove impurities such as sulfur, oxygen, and nitrogen compounds which tend to lower hydrocracking activity and/or deposit on the catalyst. With most hydrocarbon oils desired as a hydrocracking feed, mild hydrogenation reduces the sulfur content to about 0.1% w. or less, prefably 0.05% w. or less, and the residual nitrogen content to less than about 75 p.p.m. w. and preferably less than 50 p.p.m. w.

In the hydrocracking process, feed is introduced to the reaction zone as a liquid, vapor or mixed liquid-vapor phase, depending upon the temperature, pressure and amount of hydrogen mixed with the feed and the boiling range of the feed stock utilized. The hydrocarbon feed, including fresh as well as recycle feed, is introduced into the reaction zone with a large excess of hydrogen since the hydrocracking process is accompanied by rather high consumption of hydrogen, usually of the order of 500 to 2000 standard cubic feet of hydrogen per barrel of feed converted. Conversion herein refers to the products obtained which boil below 420° F. Excess hydrogen is generally recovered, at least in part, from the reaction zone effluent and recycled to the reactor together with additional makeup hydrogen. Pure hydrogen is not necessary as any suitable hydrogen-containing gas which is predominantly hydrogen can be used. For example, hydrogen-rich gas containing on the order of 70% or more hydrogen which is obtained from a catalytic reforming process can be used. High purity gas is preferred, however, so as to use lower total pressures.

Under normal conditions, total pressure employed in the hydrocracking zone will be in the range of from about 1000 to 3000 p.s.i.g. For a given partial pressure of hydrogen in the reaction zone, total pressure will depend upon such factors as purity of the hydrogen gas, hydrogen/oil ratio and the like. Too low a partial pressure of hydrogen tends to decrease catalyst life.

The amount of iron group metal in the catalyst is generally expressed as a percentage of elemental metal based on the total weight of the catalyst and can vary from about 0.1% to 14% by weight, usually not over 8% by weight. Preferably the iron group metal is present in the catalyst in the range of about 1 to 10% by weight, and particularly active catalysts are obtained with about 2 to 7% by weight of iron group metal. The amount of metal which is incorporated into the hydrogen will depend, of course, upon the particular metal used. Nickel is especially active and is preferred.

The predominant portion of the catalyst is silica and alumina, which is generally referred to as the base for the catalyst. The catalyst base generally contains from about 40% to about 90% silica with the remainder, i.e., about 60% to 10%, alumina. A silica-alumina catalyst base having good cracking activity comprises from about 70% to 90% silica and from about 30% to 10% alumina. While the silica-alumina is the most common and preferred base, other acid-acting refractory oxides, such as silica - magnesia, silica - alumina - zirconia, silica-alumina-boria, and the like may be used if desired. These acid-acting refractory oxides such as silica-alumina are generally known as primarily amorphous materials and are to be distinguished from the crystalline alumino-silicates known in the art as molecular sieves.

Any suitable method may be used for preparation of the silica-alumina hydrogel. For example, an aqueous solution of sodium aluminate is added rapidly to a solution of sodium silicate in the proper proportions to provide the desired concentration of silica and alumina in the catalyst. The pH of the mixture is brought to about 7 by the addition of a strong mineral acid, such as sulfuric acid, and the hydrogel is allowed to age approximately five minutes. The hydrogel is then washed with ammonium salt solution to eliminate, insofar as possible, sodium ions from the gel.

An alternative method of preparing silica-alumina hydrogel is to add a mineral acid, e.g. sulfuric, to an aqueous solution of sodium silicate to adjust the pH to about 2–9 and then add, for example, aluminum sulfate. This is followed by neutralization with a base such as ammonium or sodium hydroxide. The hydrogel is then washed with acidulated water (e.g. demetallized water) or ammonium nitrate solution to remove sodium ions.

The metal component is incorporated into the catalyst by contacting the hydrogel with an aqueous solution of iron group metal compound wherein the iron group metal is present as a cation, for example, a metal salt such as the sulfates, nitrates or fluorides, the fluorides being preferred. Preferably the hydrogel is reslurried in the iron group metal solution as this gives highly efficient contacting. Passing the iron group metal solution through a filter cake of the hydrogel, such as that obtained on a rotary drum filter or in a filter press, is sometimes inefficient owing to channeling of the solution through the filter cake. The hydrogel is generally washed with water to remove excess solution, dried, and calcined, preferably in air, at a temperature of from about 800° to 1200° F. Calcination temperatures of about 800° F. are generally required to provide sufficient removal of bound water and ammonia from the catalyst. At temperatures above about 1200° F., activity and stability of the catalyst tend to become adversely affected. Consequently, calcination temperature in the range from about 1050–1150° F. are preferred.

The mechanism by which a hydrogel such as a silica-alumina hydrogel takes up and holds an iron group metal is not clearly known. Silica-alumina hydrogel prepared by gellation of a solution of sodium silicate and sodium aluminate contains zeolitic sodium. In washing the hydrogel with ammonium salts, sodium ions are replaced with ammonium ions. Ammonium ions can be exchanged with metal ions as disclosed in U.S. Pat. 2,283,173. Ion-exchange is the general explanation since the metal ions are retained in the gel even after the gel has been washed to remove the metal salt solution. However, while ion-exchange may be a mechanism by which metal ions are incorporated into silica-alumina hydrogel, it would appear that this may be only a partial explanation if at all.

Because of ease in filtering and other factors, silica-alumina hydrogel is conventionally prepared by precipitating silica hydrogel from sodium silicate solution followed by the addition of aluminum sulfate solution to the silica hydrosol. Alumina is precipitated upon the silica by the addition of sodium aluminate or ammonium hydroxide to raise the pH to about 5. Sodium ions are removed from the silica-alumina hydrogel by washing with demetallized water which presumably leaves hydrogen ions at the zeolitic sites. Such a hydrogel does not appear to be readily amenable to ion-exchange with, for example, nickel. Since this hydrogel is formed under relatively acidic conditions, an appreciable amount of sulfate ion is retained in the gel and it is possible that the sulfate ion interferes with ion-exchange. Sulfate is conventionally removed from such hydrogels by a treatment with a base such as ammonium hydroxide for preparation of catalytic cracking catalysts. While the presence of sulfate has not been shown to be detrimental to hydrocracking conversion reaction, the treated hydrogels retain nickel more readily. It is possible that the nickel is retained as a complex with ammonia in the hydrogel. Thus, a clear explanation is not apparent, for nickel may be loosely sorbed by the hydrogel or may actually enter into exchange sites in the hydrogel, or may be retained as a complex with ammonia in the hydrogel. Upon calcination of the nickel-containing hydrogel, the nickel, if not already interacted with the hydrogel, interacts with the silica-alumina structure as any ammonia and structural water are evolved.

For use in hydrocracking conversion reactions, washing of the metal-containing hydrogel to remove excess metal solution can be dispensed with if desired since this eliminates a step in preparation of the hydro-cracking catalyst, reduces effluent problems, and thus results in cost savings. Metal remaining in solution is finely dispersed throughout the hydrogel, and, although it may not provide a completely reacted species, does not appear to be detrimental to the hydrocracking conversion.

A catalyst highly active and stable for hydrocracking has from about 0.1 to 5% by weight fluorine in addition to the iron group metal. In general, it is preferred that the atomic ratio of fluorine to nickel be in the range from about 1:1 to 5:1. The fluorine is incorporated into the hydrogel prior to calcination of the hydrogel. Fluorine can be incorporated into the hydrogel as the hydrogel is formed, e.g., by including a fluoride salt in the solution from which the silica-alumina is gelled, or by treating the hydrogel with a fluoride compound before, after or simultaneously with incorporation of the iron group metal. Preferably the fluorine and iron group metal are incorporated into the hydrogel simultaneously from a common solution.

The fluorine and nickel apparently form a complex which is retained in the hydrogel and is incorporated within the silica-alumina structure to provide unusually high activity and stability. An explanation would seem to be that fluorine, unlike chlorine, readily forms a complex with nickel rather than a conventional electrolyte such as is the case with chlorine. Yet, the manner in which this complex enters or is held within the hydrogel is not known. It is possible that fluoride ions, which are smaller than chlorine ions and which are about the same size as oxygen ions, tend to replace oxygen ions in the silica-alumina structure and the nickel is held as a complex therewith. On the other hand, it may be that the nickel enters into zeolitic sites and the fluorine is held as a complex therewith. This close association between the nickel and the fluorine to a great extent may result in the improved properties of the catalyst. Upon calcination, the complex of nickel and fluorine may interact with the silica-alumina in such a manner so as to leave the nickel incorporated in the silica-alumina in a high valence state. As fluoride ion is considered to be the best known ligand for stabilization of the higher valence state of iron group metals, this may account for the excellent stability of the catalysts of this invention.

Whatever may be the explanation, the incorporation of fluoride into silica-alumina hydrogel is important for it apparently results in a more stable structure than that obtained with, for example, a conventional fluoride-treated impregnated catalyst. Increased activity, if any, resulting from a conventional fluoride treatment of nickel impregnated on precalcined silica-alumina is usually lost after only a few hours use, the activity eventually being about the same or less than an impregnated catalyst which has not been treated. On the other hand, incorporation of fluoride into silica-alumina hydrogel appears to enhance the effectiveness of the hydrogenative component and of the acidic or cracking function. The presence of fluoride in the hydrogel apparently results in a more complete interaction of the metal ion, e.g. nickel ion, with silica-alumina gel, as a consequence of which a highly active and stable nickel-fluoro-silica-alumina structure is obtained upon calcination of the hydrogel. Although a fluoride content of up to about 5% may be incorporated in the ion-exchanged catalyst, there seems to be little if any advantage in going above a fluoride content of about 3% by weight.

As stated before, nickel and fluorine can be incorporated into the hydrogel from a common solution. This is advantageous as it provides highly efficient uptake of nickel and fluorine into the hydrogel and an excellent catalyst. In general, the atomic ratio of fluoride to nickel in the solution is in the range from about 1:1 to 5:1 and preferably from about 2:1 to 4:1. The higher ratio is preferred as it tends to promote the formation of

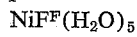

$NiF^F(H_2O)_5$ complex which seems to be highly effective for incorporation into the hydrogel. The pH of the solution should be in the range from about 4 to 7 as a higher pH tends to destroy the $NiF^F(H_2O)_5$ complex and a lower pH greatly reduces uptake into the hydrogel. Commonly available compounds such as nickel fluoride, nickel nitrate, ammonium fluoride and the like can be used in preparing solutions of the above properties. If desired, the hydrogel can be dried at low temperatures (about 250° F. or less) to remove substantially all or a portion of the sorbed water before being contacted with the solution.

If desired, other promoters or other transitional metals, e.g., the Group VI-B metals or the platinum or palladium group metals, can be incorporated into the catalyst to provide improved properties of the catalyst. The amount employed can vary over a wide range and depends, of course, on the particular properties desired for a given hydroprocess. In hydrocracking, for example, activity and stability of nickel fluoro alumino silicate catalyst of this invention can be improved by the incorporation of minor amounts, i.e. about 0.1 to 5% by weight, of tungsten into the hydrogel. This is surprising since with impregnated catalysts of the prior art, tungsten-nickel has generally been found to be more suitable for hydrotreating rather than hydrocracking wherein nickel catalysts are preferred. The role which tungsten plays when incorporated in small amounts with nickel in silica-alumina hydrogel is not clearly understood, but in general it appears that the amount of tungsten should be appreciably less on an atomic basis than the amount of nickel, e.g. less than about 0.5 and preferably less than about 0.2 that of the nickel.

The transitional metals can be incorporated into the hydrogel separately from or together with the iron group metal. Thus, a silica-alumina hydrogel can be contacted by an aqueous solution containing one metal and then contacted with another solution containing the other metal or with one solution containing both metals.

The catalyst apparently is an amorphous metal alumino silicate structure, or an amorphous metal fluoro alumino silicate, as indicated by various analytical techniques. For example, an ion-exchanged nickel-fluoro-silica-alumina catalyst calcined at 930–1020° F. was determined to be paramagnetic, indicating the nickel to be present in an ionic form. Yet, X-ray and electron diffraction examination revealed the catalyst to be amorphous with no evidence of nickel oxide crystals. Further, the ion-exchanged catalyst is resistant to sulfiding on exposure to a sulfur environment. For example, an ion-exchanged nickel catalyst exposed to a hydrogen sulfide containing gas (10 $H_2$/1 $H_2S$) at 608° F. and used to hydrocrack 30 volumes of hydrocarbon (per volume of catalyst) containing 43 p.p.m. S was determined by X-ray examination to contain little if any nickel sulfide structure. This indicates that there is little or no nickel oxide which at least under these particular conditions, is converted to crystals of nickel sulfide. With an impregnated nickel catalyst, prepared by impregnating precalcined silica-alumina (13% alumina) with nickel nitrate and calcining at 932° F., X-ray diffraction examination indicates the catalyst to contain large crystallites (approx. 400 A.) of nickel oxide. Upon exposure to a sulfur environment, the impregnated catalyst is sulfided readily since nickel oxide is substantially converted to nickel sulfide.

Compared with a nickel catalyst prepared by other methods such as impregnation on calcined silica-alumina, the high activity of the present catalyst permits higher space velocities and/or lower temperatures to be used for a given conversion with a given feed in a hydrocracking process. The use of high space velocities is advantageous in that reactor size and catalyst inventory can be lower, which is important from the cost standpoint, particularly in a high-pressure process.

Moreover, the superior resistance to nitrogen poisoning possessed by the present catalyst is quite advantageous in providing a practical commercial process. Most high-boiling gas oil and cycle stocks available in the refinery for conversion by hydrocracking generally have a high content of sulfur and nitrogen compounds. For example, a typical catalytically cracked gas oil boiling in the range of 500° F.–800° F. contains on the order of 1 to 2% w. sulfur and 400–600 p.p.m. w. total nitrogen. The usual procedure is to hydrotreat these gas oils and cycle stocks with conventional hydrotreating catalysts to reduce the sulfur and nitrogen content of the oil. However, with a given catalyst, the reduction depends upon operating severity. For example, in pilot plant hydrogenation studies at 700° F., 1500 p.s.i.g. and 20 moles hydrogen per mole oil with a nickel molybdenum on alumina catalyst having a good denitrification activity, a space velocity of only 0.4 was required to reduce the total nitrogen content of the catalytically cracked oil to about 25 p.p.m. w., whereas a space velocity of 0.1 was required to reduce nitrogen content to as low as 2 p.p.m. w. The higher severity required to obtain the lower nitrogen level adds greatly to the size and cost of a hydrotreating unit. Moreover, hydrogen consumption in reducing the total nitrogen content to about 25 p.p.m. w. was only about 900 s.c.f./bbl. compared with about 1300 s.c.f./bbl. in reducing the total nitrogen content to 2 p.p.m. w. The increased hydrogen consumption results primarily from hydrogenation of aromatics at the higher severity. In the subsequent hydrocracking operations, hydrogen consumption is higher with a less hydrogenated gas oil feed than with the severely hydrogenated gas oil. Even so, however, total hydrogen consumption in the combination of hydrotreating and hydrocracking is generally lower with mild hydrotreating than with severe hydrotreating. This is an important consideration, especially where hydrogen is in short supply and hydrogen generation facilities are required.

The effect of nitrogen compounds on hydrocracking catalyst performance depends to a certain extent upon the type of the nitrogen compound and thus, in a practical sense, upon the nature of the feed. For example, in a homologous series such as pyridine, quinoline, and acridine, the rate of decrease of activity is related to the ratio of basicity of the compound to the vapor pressure of the compound. On the other hand, even certain relatively non-basic compounds, such as benzonitrile, are strong poisons. Ammonia appears to be more of a cracking suppressor than a poison since catalyst activity levels off in the presence of ammonia instead of decreasing continuously. In general, therefore, the nitrogen content of a light feed such as light gas oil may be higher than that of a heavy feed such as heavy gas oil. Moreover, the nitrogen content of a straight-run gas oil may be somewhat higher than a similar boiling catalytically cracked gas oil, since a portion of the nitrogen compounds in the straight-run gas oil seem to be innocuous or easily converted to less deleterious forms. Thus, while some feeds of quite high nitrogen content may be hydrocracked, better results are obtained if the total nitrogen content is reduced to below about 75 p.p.m. w. and preferably below 50 p.p.m. w.

EXAMPLE I

Activity and stability of impregnated and the present catalysts were determined in bench-scale hydrocracking of a hydrogenated catalytically cracked gas oil containing 2.2 p.p.m. N and 43 p.p.m. S. A catalyst was prepared by rapidly adding a solution of sodium aluminate to a solution of sodium silicate, the relative proportions being such as to give about 28% alumina in the gel. Solution pH was brought to about 7 by the addition of dilute $H_2SO_4$. The hydrogel which formed was washed with $NH_4NO_3$ solution and water to remove substantially all sodium ions. The washed hydrogel was slurried with nickel nitrate solution (to provide approximately 4% w. Ni in the catalyst) and then dried and calcined in air at 930° F.–1020° F.

An impregnated catalyst was prepared by impregnating pelleted silica-alumina (25% $Al_2O_3$) with nickel nitrate to provide 4.9% w. nickel, calculated as metal, in the final catalyst. The impregnated catalyst was dried and calcined at 1020° F.

Each catalyst was separately tested in a bench scale hydrocracking unit. A stream of hydrogen was passed over the catalyst for three hours as the catalyst was brought to the reaction temperature. In the case of the impregnated catalyst hydrogen sulfide was included in the gas stream (10 $H_2$/1 $H_2S$) to convert the nickel oxide to nickel sulfide, a form which is known in the art as a good hydrocracking catalyst. The gas oil feed was then hydrocracked at 1500 p.s.i.g., 645° F., 4 LHSV and 10/1 molar ratio of hydrogen to oil. An activity and stability index is obtained for each catalyst, as determined by refractive index data which is indicative of conversion to gasoline and lower boiling products. Activity index corresponds to the conversion at 3 hours' time in the process period. Stability index is the percent of retention of activity after a decade of running, e.g., indicated activity at 10 hours as a percent of activity at one hour. Activity and stability of the "ion-exchanged" catalyst was 69 and 54, respectively, whereas the activity and stability of the impregnated catalyst was 31 and 60, respectively.

EXAMPLE II

The effect of fluoride on properties and performance of a catalyst comprising nickel incorporated into silica-alumina hydrogen is demonstrated by the following experiments. Nickel catalysts (approximately 4% w. Ni) with and without fluoride were prepared according to the method described in Example I. To incorporate fluoride into the silica-alumina hydrogel, sodium fluoride was added to the sodium aluminate solution in an amount to provide 1.8% w. F in the final catalyst. Bench-scale hydrocracking tests were made in the manner and with the feed as described in Example I. The catalyst containing no fluoride had a density of 0.82 g./ml., an activity of 69 and a stability of 54. The catalyst containing fluoride had a density of 0.91 g./ml., an activity of 98, and a stability of 65.

EXAMPLE III

Comparative experiments with an "ion-exchanged" catalyst and impregnated catalysts demonstrate a marked superiority of the "ion-exchanged" catalyst for conversion of relatively high nitrogen-containing feeds. A nickel catalyst was prepared according to the procedure described in Example I except that fluoride was incorporated into the silica-alumina hydrogel by adding sodium fluoride to the sodium aluminate solution before it was added to the sodium silicate solution. The catalyst, containing approximately 3.7% w. Ni and 1.8% w. F, was dried and calcined at about 1100° F.

An impregnated nickel catalyst was prepared by pelleting a commercial silica-alumina (25% $Al_2O_3$) cracking catalyst using a stearic acid (2% w.) as binder. The pelleted catalyst was calcined at 930° F. to burn out the binder before being impregnated with an aqueous solution of nickel nitrate. The impregnated catalyst was dried and calcined at 1420° F. The final catalyst contained 5.5% w. nickel calculated as metal.

An impregnated tungsten-nickel catalyst was prepared from commercial silica-alumina (app. 25% $Al_2O_3$). Extruded pellets of the silica-alumina were impregnated with an aqueous solution of nickel nitrate, ammonium metatungstate, and ammonium bifluoride, dried and calcined. The finished catalyst contained 11.7% w. Ni, 18.8% w. W and app. 33% w. F.

The impregnated and "ion-exchanged" catalysts were separately tested for an extended period of time in hydrocracking mildly hydrogenated catalytically cracked gas oil having typical properties given below:

ASTM distillation, ° F.:
| | |
|---|---|
| IBP | 360 |
| 5% | 530 |
| 10% | 563 |
| 20% | 595 |
| 30% | 613 |
| 40% | 629 |
| 50% | 643 |
| 60% | 657 |
| 70% | 673 |
| 80% | 690 |
| 86% | 700 |
| Sulfur, p.p.m. w. | 210 |
| Total nitrogen, p.p.m. w. | 23 |

In the test procedure the catalyst was placed in the reactor vessel and heated to the desired initial reaction temperature over a period of about three hours while passing therethrough a stream of hydrogen gas. In the case of the impregnated catalysts, hydrogen sulfide was included in the hydrogen gas (10 $H_2$/1 $H_2S$) to convert the nickel oxide to nickel sulfide. Hydrogenated catalytically cracked gas oil and hydrogen were then continuously charged to the reactor. Reactor pressure was maintained at 1500 p.s.i.g. Temperature was adjusted as necessary to maintain conversion to gasoline and lower boiling products at 60 to 65% w.

With the impregnated nickel catalyst, the starting temperature for the gas oil feed was 590° F. at a liquid hourly space velocity (LHSV) of 1 and a hydrogen/oil ratio of 40/1. Catalyst decline under these conditions was quite rapid so that frequent temperature increases were necessary to maintain conversion as the run progressed. As the temperatre became higher, catalyst decline rate became even more severe and it became difficult to maintain conversion, which varied between 55% to 65%. Therefore, after only 120 hours operation, during which the time temperature had been increased to 698° F., space velocity was reduced to 0.67. After a brief interval of fairly steady operation, catalyst activity soon began to decline again at a rapid rate. The temperature having reached 725° F. after an additional 190 hours of operation, the run was terminated. Total catalyst life to 750° F. reaction temperature was determined to be only 450 hours by extrapolation of the catalyst decline rate as determined from a graph of time in hours, on a logarithmic scale, against temperature demand.

With the impregnated tungsten-nickel catalyst, a space velocity of 0.67 and a $H_2$/oil ratio of 15/1 were maintained during the entire operation. Catalyst decline for this catalyst, even under the relatively low space velocity, was quite rapid. As temperature became higher, catalyst decline rate became even more severe. The temperature demand was 696° F. after only 8.5 days and 743° F. after 25 days, when the operation was terminated.

With the "ion-exchanged" catalyst, the starting temperature for the gas oil feed at an LHSV of 1 was approximately 535° F. The markedly lower temperature requirement for 60 to 65% conversion was indicative of a more active catalyst. Hydrogen/oil ratio was maintained in the range of 15/1–20/1. Operation was relatively steady with only slight periodic temperature increases required to maintain conversion. A temperature demand of only 680° F. after approximately 1500 hours operation demonstrates the excellent stability of the "ion-exchange" nickel catalyst.

EXAMPLE IV

A silica-alumina hydrogel for catalysts of this invention is prepared by diluting 376 gms. sodium silicate (27.0% $SiO_2$) to 2400 ml. with distiled water. The sodium silicate solution is triturated to pH 9.0 with 3 molar $H_2SO_4$ and the gel which forms is aged 10 minutes. An aluminum sulfate solution consisting of 209 gms.

$$Al_2(SO_4)_3 \cdot 18H_2O$$

in 1000 ml. water is added to the gel with rapid stirring. The pH of the solution is raised from about 3.0 to 5.0 by the addition of 3 molar $NH_4OH$ to precipitate alumina. The resulting silica-alumina gel is filtered and washed with acidulated water ($H_2SO_4$ pH of 3) to remove sodium ions and dilute ammonium hydroxide to remove sulfate ions.

Washed hydrogel was slurried in an aqueous solution containing 30.0 gms. $Ni(NO_3)_2 \cdot 6H_2O$ and 10.3 gms. $NH_4F$ and left for four hours. The hydrogel was filtered, washed with water, dried at 248° F., and calcined at temperatures up to about 1100° F. The finished catalyst contained 3.8% w. nickel and 2.9% w. fluorine.

Another catalyst was similarly prepared by contacting washed hydrogel with a solution containing 30.0 gms. $Ni(NO_3)_2 \cdot 6H_2O$, 10.3 gms. $NH_4F$ and 9.0 gms.

$$(NH_4)_2W_4O_{13} \cdot 8H_2O$$

The finished catalyst contained 3.7% w. nickel, 4.1% w. tungsten, and 2.6% w. fluorine.

These catalysts were employed in hydrocracking a high boiling catalytically cracked oil which had been hydrotreated. The hydrotreated oil had the following properties:

| | |
|---|---:|
| Gravity, ° API | 25.2 |
| Sulfur, percent w. | 0.038 |
| Nitrogen, p.p.m. w. | 23 |
| ASTM dist., ° F.: | |
| IBP | 500 |
| 10% | 612 |
| 30% | 650 |
| 50% | 679 |
| 68.5% | 700 |

The hydrotreated oil was hydrocracked at 1500 p.s.i.g., 10/1 $H_2$/oil, and 0.67 LHSV. Temperature was controlled to maintain 65% v. conversion to products boiling less than 420° F.

The nickel catalyst was less active and less stable than the tungsten-nickel catalyst as indicated by the temperature required to maintain conversion. After about 290 hours' operation, the nickel catalyst required a temperature of 659° F. whereas the tungsten-nickel catalyst required a temperature of only 646° F. Moreover, the nickel catalyst steadily declined in activity as indicated by a temperature requirement of 671° F. after 565 hours and 684° F. after 740 hours' operation. In contrast, activity of the tungsten-nickel catalyst was relatively constant, a temperature of only 649° F. being required after 565 hours.

EXAMPLE V

A nickel catalyst was prepared by slurrying silica-alumina hydrogel (app. 20% alumina and substantially free from sodium ions) in an aqueous solution of nickel nitrate and ammonium fluoride to incorporate nickel and fluoride ions into the hydrogel. The hydrogel was then washed, dried and calcined. The finished catalyst contained 4.4% w. nickel and app. 2.5% w. F.

A tungsten catalyst was prepared by mulling 1333 gms. of silica-alumina hydrogel (app. 25% w. alumina and substantially free from sodium ions) with 80.0 ml. of solution containing 30.6 g. $(NH_4)_2W_4O_{13} \cdot 8H_2O$ and 6 gms. $NH_4HF_2$ followed by drying and calcining the finished catalyst contained 8.5% w. W and 1.8% w. F.

Source of the feed material used in this example was a heavy catalytically cracked gas oil having the following properties:

| | |
|---|---:|
| Gravity, ° API | 23.2 |
| Sulfur, percent w. | 1.35 |
| Nitrogen, p.p.m. w. | 516 |
| ASTM dist., ° F.: | |
| IBP | 532 |
| 10% | 612 |
| 30% | 648 |
| 50% | 670 |
| 70% | 694 |
| 74.8% | 700 |

The gas oil was hydrotreated to provide a hydrocracking feed containing 200 p.p.m. w. S and 0.5 p.p.m. w. N. The hydrotreated oil was hydrocracked at 1200 p.s.i.g. 15/1, $H_2$/oil, and 0.67 LHSV using each of the above catalysts. Temperature was adjusted as necessary to provide 62% w. conversion to products boiling less than 420° F. With such a feed of low nitrogen content, the nickel catalyst was quite active and stable. A temperature of only 583° F. was required after 250 hours' operation when operation was terminated. Activity of the tungsten catalyst was considerably less than the nickel catalyst as indicated by a temperature demand of 622° F. at 250 hours' operation, and despite the low nitrogen content of the feed, activity of the tungsten catalyst steadily declined.

EXAMPLE VI

A co-gelled catalyst was prepared by mixing aqueous solutions of sodium silicate, sodium aluminate and sodium fluoride and then adding to the mixture an aqueous solution of nickel nitrate at such a rate that all of the nickel nitrate solution was added by the time the solution was completely gelled. Solution pH was brought to about 7 by addition of dilute $H_2SO_4$. The hydrogel was then allowed to age for about 5 minutes, after which it was washed with ammonium nitrate solution and water to remove substantially all of the sodium ions. The washed hydrogel was dried for approximately 15 hours at 248° F. (120° C.), crushed, sized, and calcined at 930° to 1020° F. for about 4 hours. The final catalyst contained about 3.6% w. nickel, calculated as metal, and approximately 1.8% w. F., with about 28% alumina in the base.

A catalyst was similarly prepared but instead of adding nickel nitrate solution as the silica-alumina hydrogen was being formed, the hydrogel was slurried in nickel nitrate solution to ion-exchange nickel into the hydrogel. The nickel content of the ion-exchanged catalyst was approximately 3.6% w. The ion-exchanged hydrogel was then dried, crushed and calcined as described above for the co-gelled catalyst. The ion-exchanged and co-gelled nickel catalysts were separately tested in a bench scale hydrocracking unit under identical conditions. A mixture of hydrogen and hydrogen sulfide (10 $H_2$/1 $H_2S$) was passed over the catalyst for three hours as the catalyst was brought to reaction temperature. Hydrocracking was carried out with the feed and under conditions as described in Example I. Activity and stability of the co-gelled catalyst was 83 and 62, respectively, whereas activity and stability of the ion-exchanged catalyst was 94 and 69, respectively. Catalyst density of 0.93 g./cc. for the ion-exchanged catalyst was somewhat higher than the 0.82 g./cc. obtained for the co-gelled catalyst.

EXAMPLE VII

Silica-alumina hydrogel was prepared according to the procedure given in Example IV. Fluorine was incorporated into the hydrogel by slurrying the hydrogel in a solution of ammonium fluoride. Another catalyst was prepared by slurrying hydrogel in a solution containing nickel and fluoride ions. A third catalyst was prepared by impregnating a previously calcined silica-alumina (app. 13% $Al_2O_3$) cracking catalyst with fluoride.

These catalysts were used for hydrocracking n-decane (Phillips Petroleum Pure Grade). The results are given below in Table I.

TABLE I

| | Catalyst preparation | | |
|---|---|---|---|
| | Impregnated, 1.5% F | Hydrogel, 2.4% F | Hydrogel, 4.4% Ni, approx. 3% F |
| Pressure, p.s.i.g. | 1,200 | 1,200 | 1,200 |
| Temperature, °F. | 450 | 550 | 451 |
| LHSV | 1.0 | 1.0 | 1.0 |
| Conversion, percent w. < $C_{10}$ | 1.6 | 3.9 | 90.5 |

It can be seen that of itself, fluorine incorporated into silica-alumina hydrogel results in an activity little better than that of impregnated fluorine despite a much higher temperature. In contrast, incorporation of nickel, a hydrogenation component, with the fluorine into the hydrogel results in a highly active catalyst.

EXAMPLE VIII

A silica-alumina hydrogel was prepared according to the procedure given in Example IV. Approximately 1600 grams of hydrogel (about 8–10% solids) was slurried in two liters of an aqueous solution containing 14 grams $NiF_2 \cdot 4H_2O$ and 7 grams $NH_4F$ and having a pH of 6.1. Uptake of nickel from the solution by the hydrogel was virtually complete. When a solution containing only the nickel fluoride was used (pH of 5.8), uptake of nickel was about 80–85%.

EXAMPLE IX

In another embodiment of the invention a cobalt hydrocracking catalyst is prepared in a manner similar to that described in Example III. A silica-alumina hydrogel, after being washed with ammonium nitrate solution and water to remove sodium ions, is slurried in a solution of cobalt nitrate. The hydrogel is then filtered, washed, dried, and calcined in air at 1100° F. The cobalt catalyst is active and quite stable in the hydrocracking of hydrogenated gas oil boiling in the range 450–650° F. at 650° F., 2 LHSV, 1500 p.s.i.g., and 15/1 hydrogen/oil mole ratio.

EXAMPLE X

To demonstate the effect of calcination temperature, a hydrogel of silica-alumina (approximately 22% w. alumina) was prepared and washed to remove sodium and sulfate ions. The washed hydrogel was soaked in a solution containing nickel nitrate and ammonium fluoride, after which it was given another wash to remove excess solution. The uptake of nickel and fluoride was sufficient to provide approximately 4.2% w. nickel and 2.4% w. fluorine, based upon the final dry weight of the catalyst. The preparation was divided into three separate portions, each of which was calcined in air at different temperatures as shown below

| Catalyst | Calcination temp., °F. | Surface area, m.²/g. |
|---|---|---|
| A | 1,112 | 441 |
| B | 1,202 | 415 |
| C | 1,292 | 360 |

These catalysts were tested individually for hydrocracking hydrodenitrified catalytically cracked heavy gas oil. Typical properties of the hydrocracker feed are as follows:

Mol wt. _____ 247
Nitrogen, p.p.m. _____ 1
Sulfur, p.p.m. _____ 40–60
Aromatics, millimoles/100 gms. _____ 136–166

The hydrocracking was conducted at 1500 p.s.i.g. total pressure, 15/1 $H_2$/oil, and 1 LHSV. Temperature was periodically adjusted as necessary to maintain conversion at about 67% w.

With Catalyst A, activity and stability were very good. Activity decline rate was only 0.60° F./day when operations were terminated at the end of 685 hours. Catalyst B was only slightly less active in the temperature requirement to maintain conversion was about 6° F. higher than that for Catalyst A. Activity decline rate was about the same as for Catalyst A. With Catalyst C, however, the activity decline rate was noticeably higher. After some 450 hours' operation. Catalyst C began to deactivate at an increasing rate. Operation with Catalyst C was terminated at the end of about 570 hours, the catalyst decline rate being 2.75° F./day over the final 110 hour period.

The loss in activity and stability at high calcination temperatures is quite surprising, considering that it is taught in the art that catalysts wherein nickel is impregnated on silica-alumina are improved in activity at very high calcination temperatures on the order of 1300–1475° F. (about 700–800° C.) (see British Pat. 917,469 or Canadian Pat. 683,239). To determine the activity of an impregnated catalyst calcined at high temperatures, a catalyst was prepared by pelleting spray dried silica-alumina (25% w. alumina) calcining at 1020° F. to burn out the binder (stearic acid), impregnating with fluoride, drying, impregnating with nickel nitrate, and calcining at 1418° F. (770° C.). The final catalyst, which contained 5.5% w. nickel and 3.1% w. fluorine was sulfided at 608° F. with a mixture of hydrogen and hydrogen sulfide (10/1 $H_2/H_{25}$) and tested under the hydrocracking conditions given above. Activity and stability were very poor and the operation was terminated at the end of about 250 hours with a temperature demand of 698° F. Activity decline rate for the last 145 hours was 16.7° F./day.

EXAMPLE XI

A hydrogel of silica-alumina (approximately 22% w. alumina) was prepared and washed to remove sodium and sulfate ions. The washed hydrogel was soaked in a solution containing ferric nitrate and ammonium fluoride to give about 8% w. iron and 3% w. fluorine in the final catalyst, after which the hydrogel was given another wash to remove excess solution. The catalyst was calcined at 1112° F.

This catalyst was treated with a mixture of hydrogen and hydrogen sulfide (1011 $H_2/H_{25}$) at 608° F. and was used to hydrocrack a catalytically cracked heavy gas oil, hydrotreated to 3 p.p.m. N. Hydrocracking conditions were 1500 p.s.i.g., 15/1 $H_2$/oil mol ratio, and 0.67 LHSV. Temperature was adjusted as necessary to maintain conversion at about 65–67% w. Activity and stability of the catalyst was quite good as shown by an increase in a temperature demand from 586° F. at 65 hours to 599° F. at 141 hours.

A catalyst containing tungsten in addition to iron was prepared in a similar manner by including ammonium metatungstate in the solution containing the ferric nitrate and ammonium fluoride. The final catalyst contained 2.7% iron, 3.5% w. tungsten, and 2.5% w. fluorine. When tested in the manner described above, activity and stability were substantially the same as for the iron catalyst. Activity declined from 586° F. at the end of 50 hours to only 606° F. at the end of 300 hours, at which time mechanical difficulties were encountered which soon necessitated termination of the experiment.

Catalysts prepared by impregnating iron onto previously calcined silica-alumina cracking catalyst are so low in activity and stability as to be impractical.

I claim as my invention:

1. A catalyst suitable for hydrocracking hydrocarbon oils which comprises from about 0.1% to 14% by weight of an iron group metal and about 0.1% to 5% by weight fluorine incorporated into an amorphous acid-acting refractory oxide, said incorporation being effected by contacting a hydrogel of the acid-acting refractory oxide substantially free from sodium with an aqueous solution of an iron group metal compound wherein the metal is present as a cation, washing the contacted hydrogel to remove unreacted iron group metal, and calcining said contacted hydrogel at a temperature of about 800° to 1200° F., said fluorine being incorporated into the hydrogel prior to calcination.

2. A catalyst suitable for hydrocracking hydrocarbon oils which comprises from about 0.1% to 14% by weight nickel and about 0.1% to 5% fluorine incorporated into amorphous silica-alumina, said incorporation being effected by contacting silica-alumina hydrogel substantially free from sodium with an aqueous solution of a nickel compound wherein the nickel is present as a cation, washing the contacted hydrogel to remove unreacted nickel, and calcining said contacted hydrogel at a temperature of about 800° to 1200° F., said fluorine being incorporated into the hydrogel prior to calcination.

3. A catalyst suitable for hydrocracking hydrocarbon oils which comprises from about 1% to 10% by weight nickel and about 0.1% to 5% by weight fluorine incorporated into amorphous silica-alumina having from about 40% to 90% by weight silica, said incorporation being effected by contacting a hydrogel of the silica-alumina substantially free from sodium with an aqueous solution containing a fluoride compound and a nickel compound wherein the nickel is present as a cation, the atomic ratio of fluoride to nickel in said solution being in the range from about 2:1 to 4:1 and the pH of the solution being in the range from about 4–7, washing the contacted hydrogel to remove unreacted nickel, and calcining the contacted hydrogel.

References Cited

UNITED STATES PATENTS 2,310,278 2/1943 Connolly _____ 208—111
3,120,483 2/1964 Hansford et al. _____ 208—110

DELBERT E. GANTZ, Primary Examiner

R. BRUSKIN, Assistant Examiner

U.S. Cl. X.R.

252—441, 453, 455, 458